United States Patent
Hildebrand et al.

[11] 4,064,390
[45] Dec. 20, 1977

[54] METHOD AND APPARATUS FOR READING CODED LABELS

[75] Inventors: Alfred P. Hildebrand, Mountain View; Howard E. Morrow, San Jose; Henry W. Jones, San Leandro, all of Calif.

[73] Assignee: Spectra-Physics, Inc., Mountain View, Calif.

[21] Appl. No.: 753,815

[22] Filed: Dec. 23, 1976

Related U.S. Application Data

[63] Continuation of Ser. No. 677,865, April 19, 1976, which is a continuation of Ser. No. 568,666, April 16, 1975, which is a continuation of Ser. No. 466,803, May 3, 1974.

[51] Int. Cl.$^2$ .................. G06K 7/14; G02B 5/14; G06K 9/12
[52] U.S. Cl. .................. 235/470; 235/467; 340/146.3 F; 350/3.5
[58] Field of Search .............. 235/61.11 E, 61.11 N, 235/61.11 R, 61.11 F, 61.8 R, 61.8 F; 340/146.3 F, 146.3 K, 146.3 Z; 350/3.5; 250/566, 568, 269, 567

[56] References Cited
U.S. PATENT DOCUMENTS

| | | | |
|---|---|---|---|
| 3,728,677 | 4/1973 | Munson | 340/146.3 F |
| 3,758,783 | 9/1973 | Sick | 235/61.11 E |
| 3,796,863 | 3/1974 | Nickl | 235/61.11 E |
| 3,800,282 | 3/1974 | Acker | 340/146.3 Z |
| 3,812,325 | 5/1974 | Schmidt | 235/61.11 E |
| 3,818,191 | 6/1974 | Fennema | 235/61.11 E |

*Primary Examiner*—Robert M. Kilgore
*Attorney, Agent, or Firm*—Flehr, Hohbach, Test, Albritton & Herbert

[57] ABSTRACT

Method and apparatus for reading machine readable coded labels on merchandise at a check-out station. A window is associated with the check-out station, together with means for supporting merchandise for movement past the window. A laser source having an output beam focused at a plane slightly beyond the window produces multiple vertical beams $V_1$, $V_2$, $V_3$ having predetermined angular divergence and a horizontal beam H. Scanning optics, including a mirror wheel having a plurality of mirrors thereon, provides a raster location and a sub-raster location. Relay optics accept and inject the horizontal beam into the raster location movement of the wheel causing the horizontal movement of the H scan line at the window. The vertical beams impinge upon the sub-raster location from which the relay optics accept and inject the beams $V_1$, $V_2$, $V_3$ over to the raster location. The relay optics serve to transform the motion of the wheel at the sub-raster location into a vector cancelling the horizontal scanning component at the raster location while adding a resultant of the sub-raster scan into a point image with a purely angular scan component at the raster location. Gating means is provided for permitting only one of the beams $V_1$, $V_2$, $V_3$, or H to pass through the system at a time. Retrodirective viewing means receives reflective light from the area of impingement of the beam on the label, the reflected light being converted into electric signals indicative of the strength of reflection.

22 Claims, 14 Drawing Figures

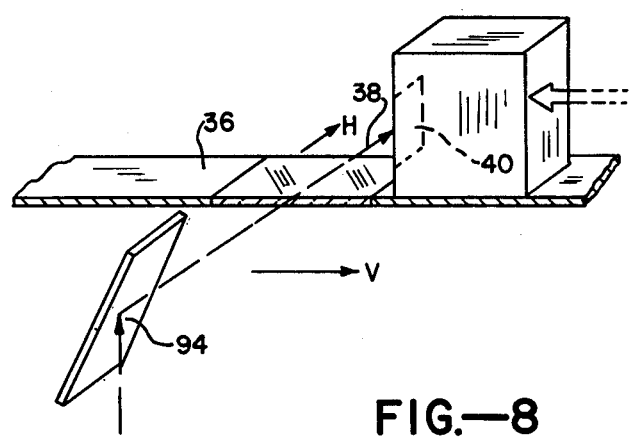
FIG.—8
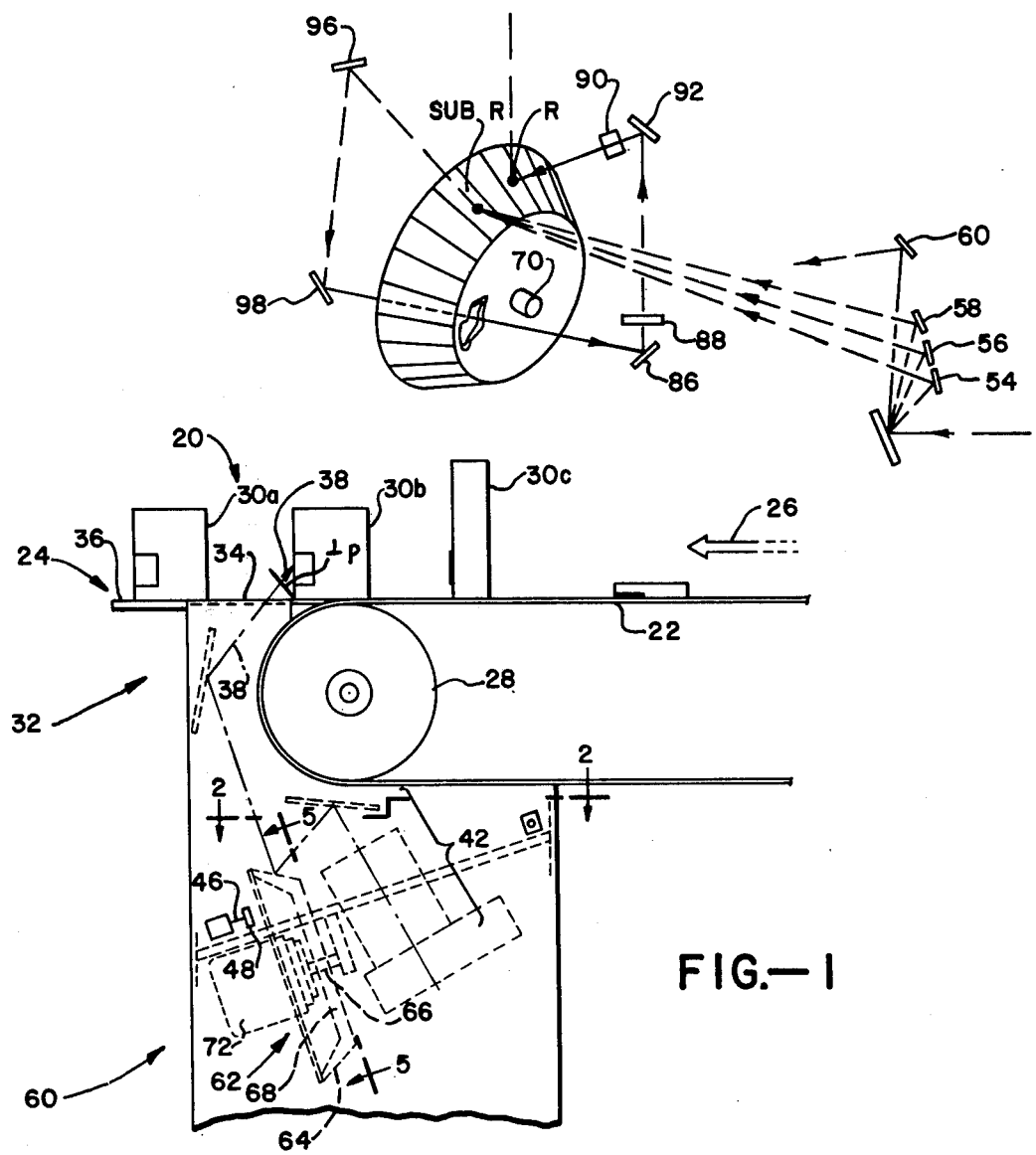
FIG.—1

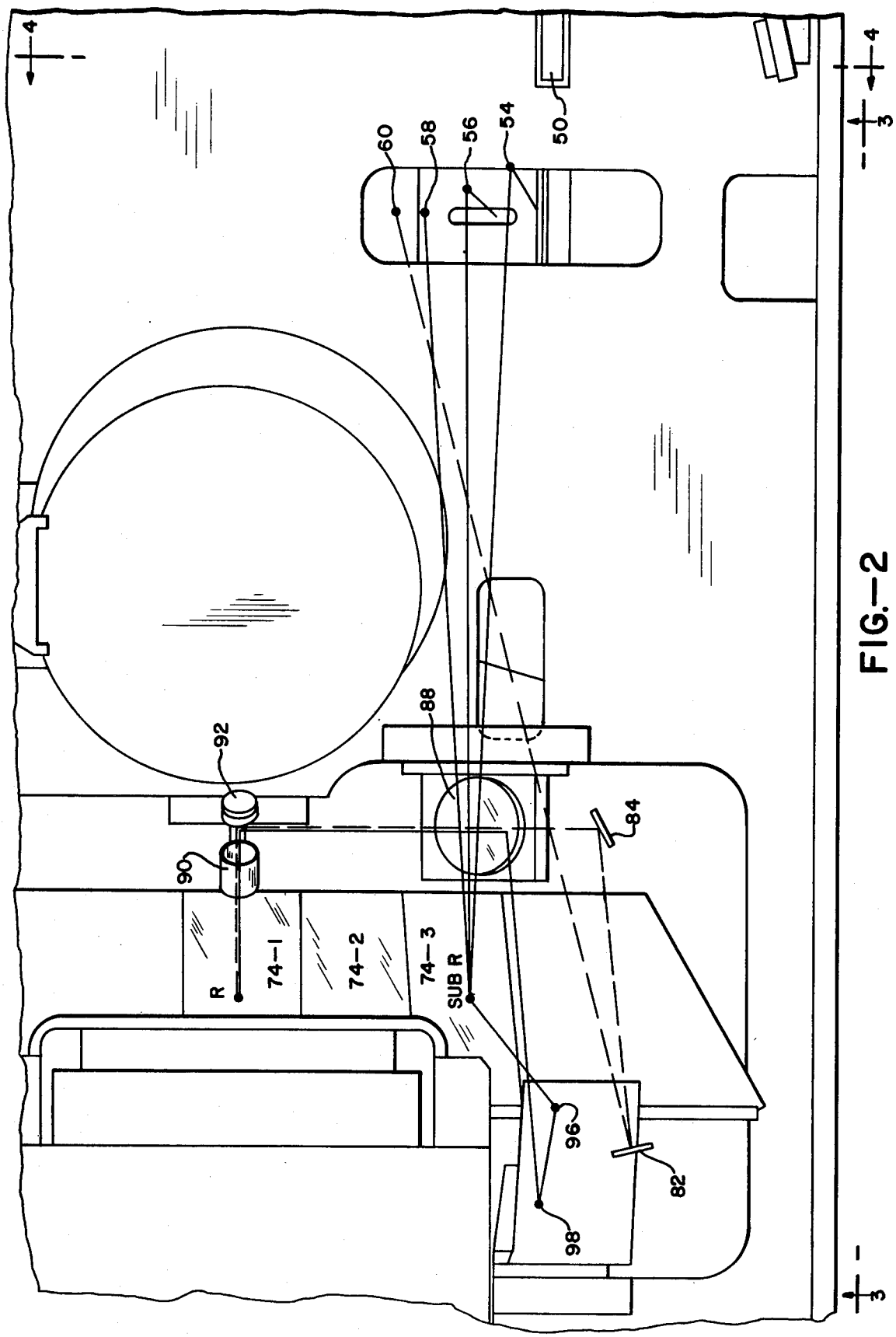

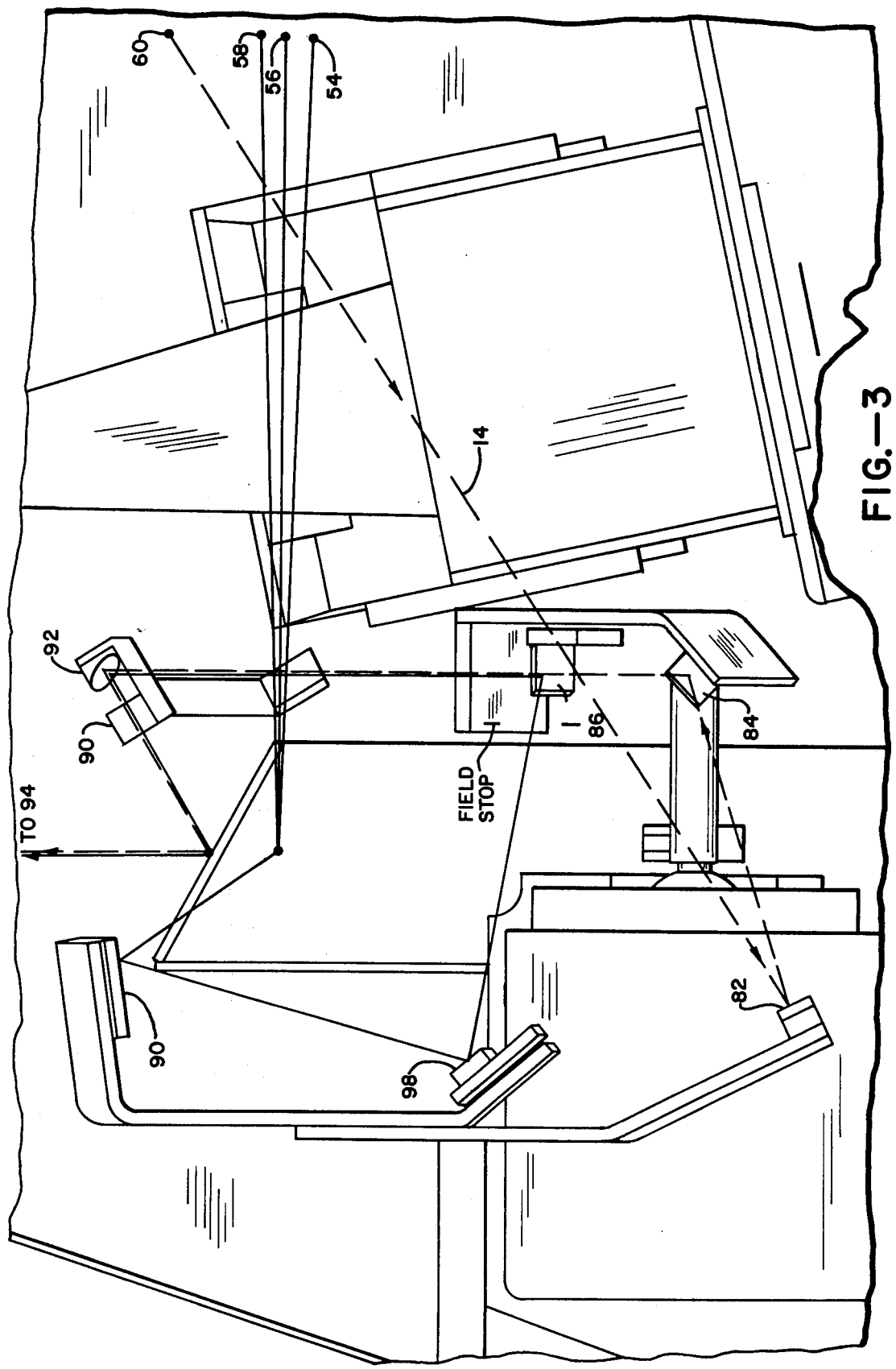

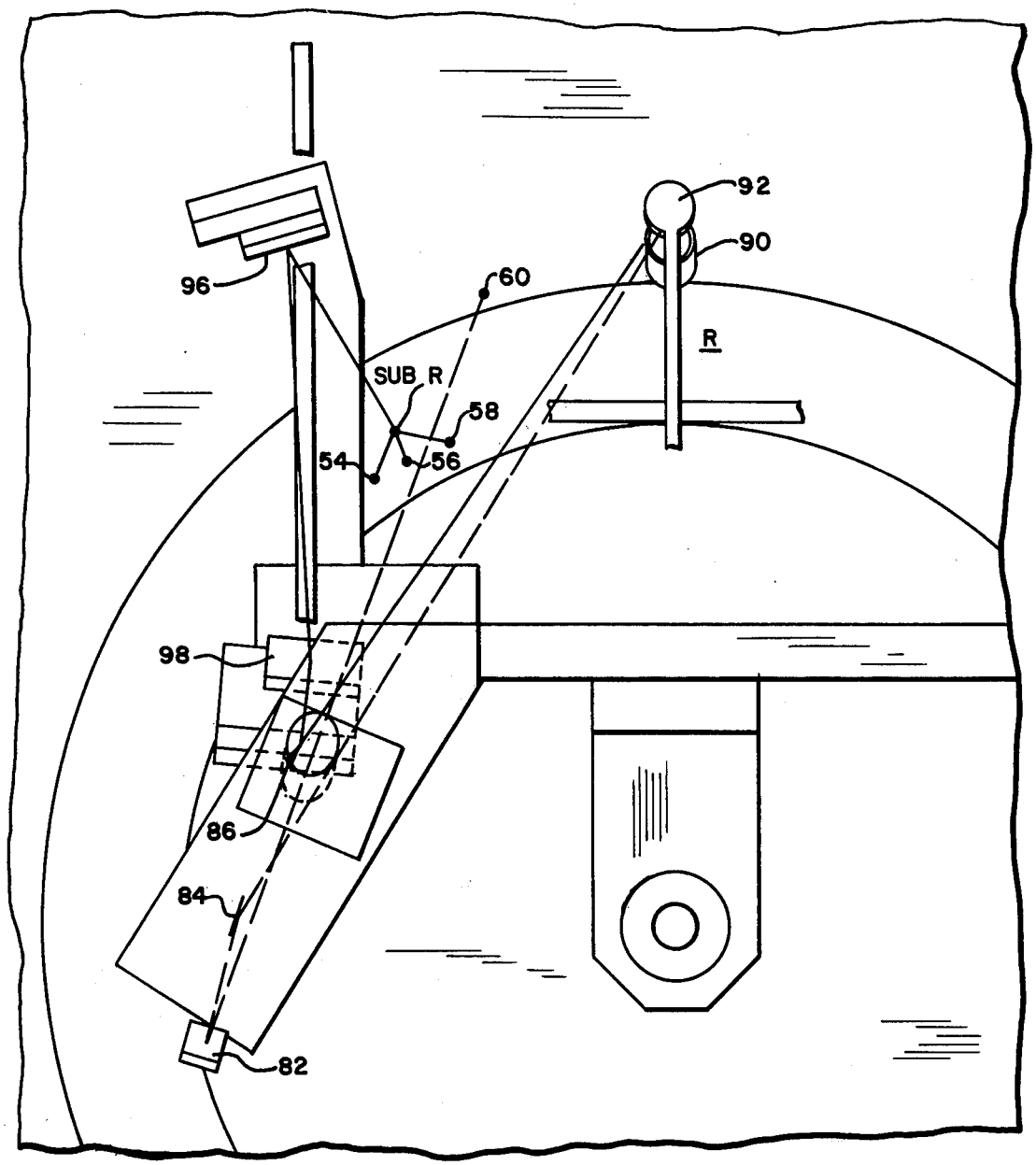
FIG.—4
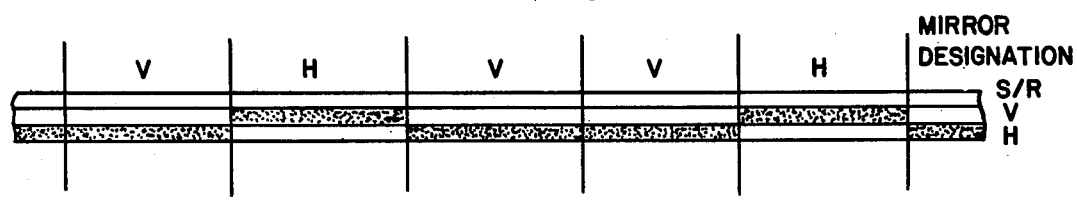
FIG.—14

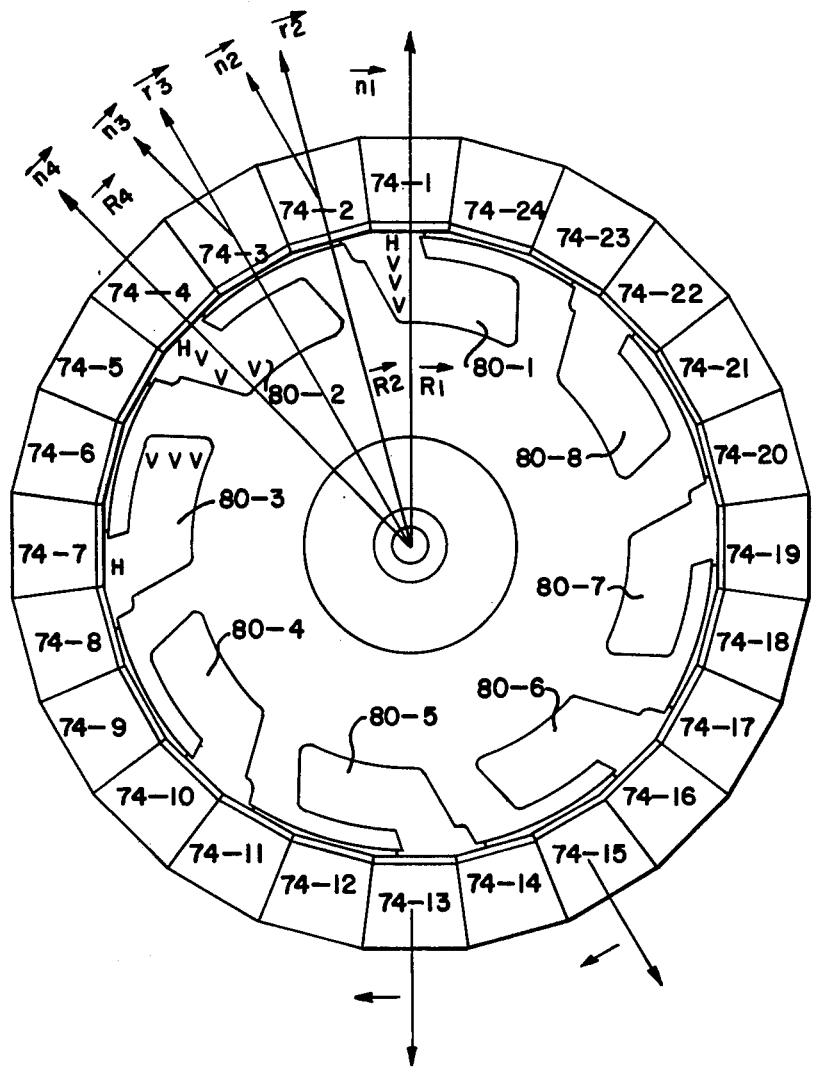
FIG.—5

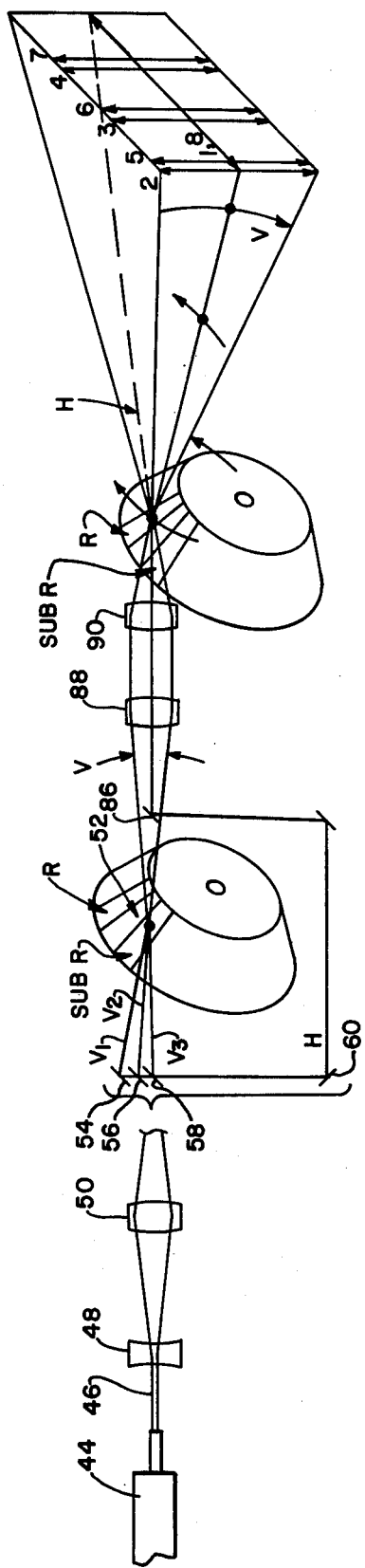
FIG.—6
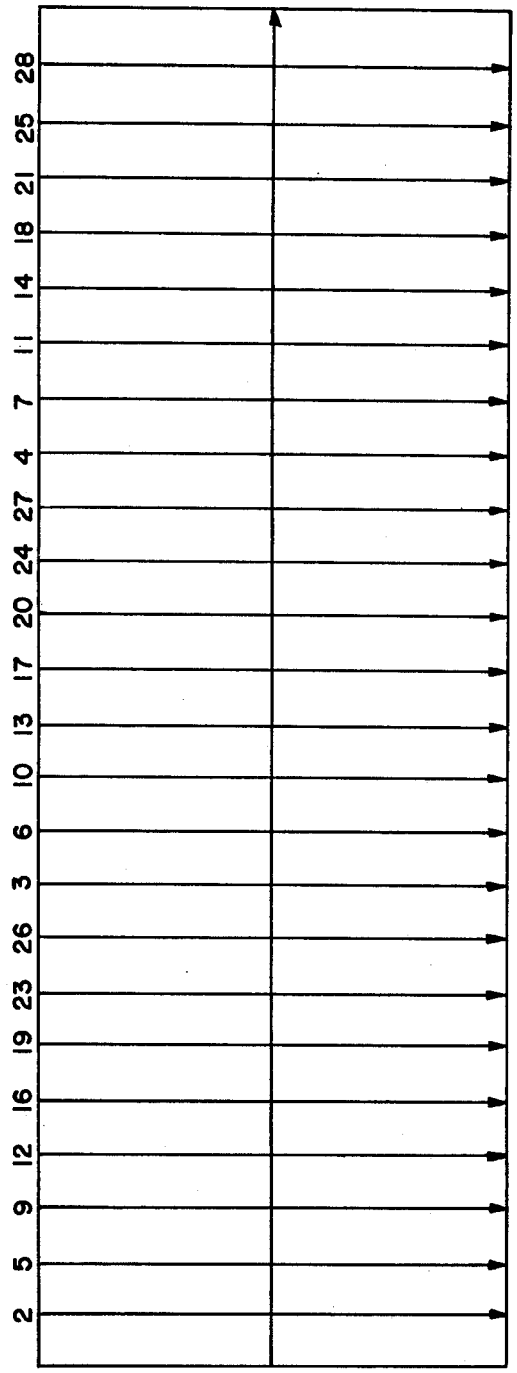
FIG.—10

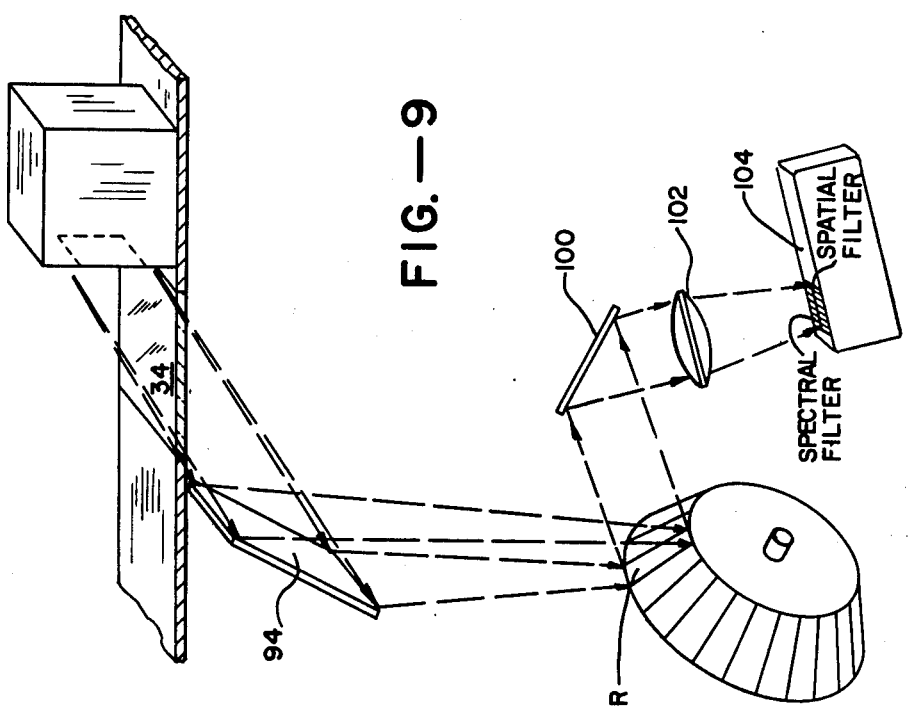
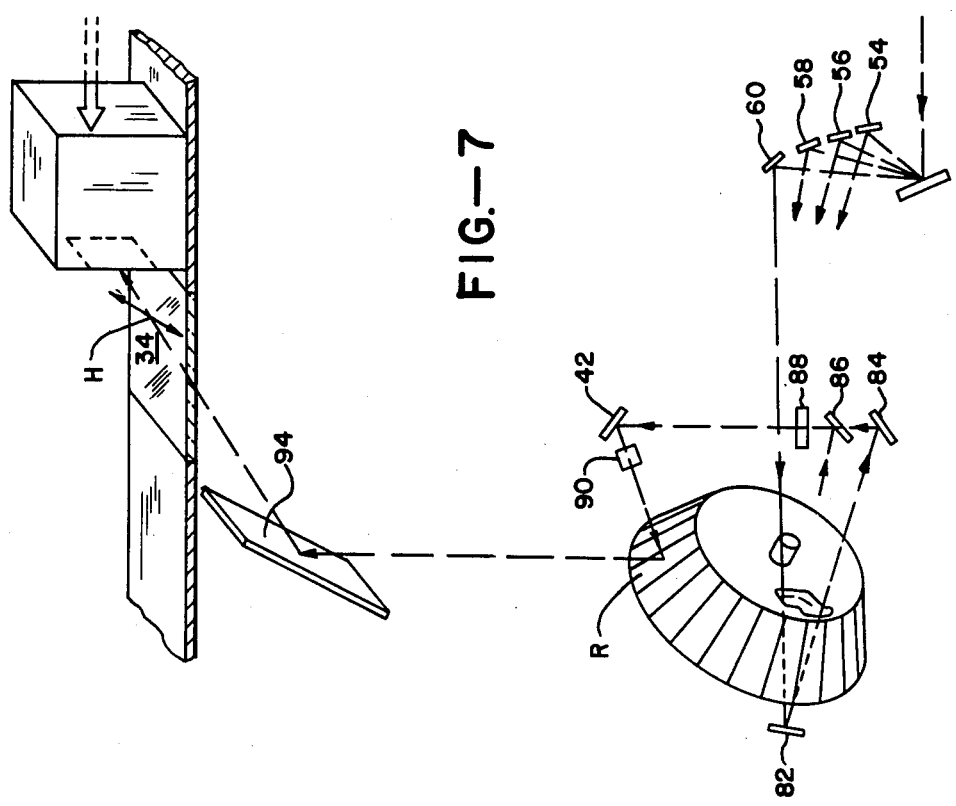

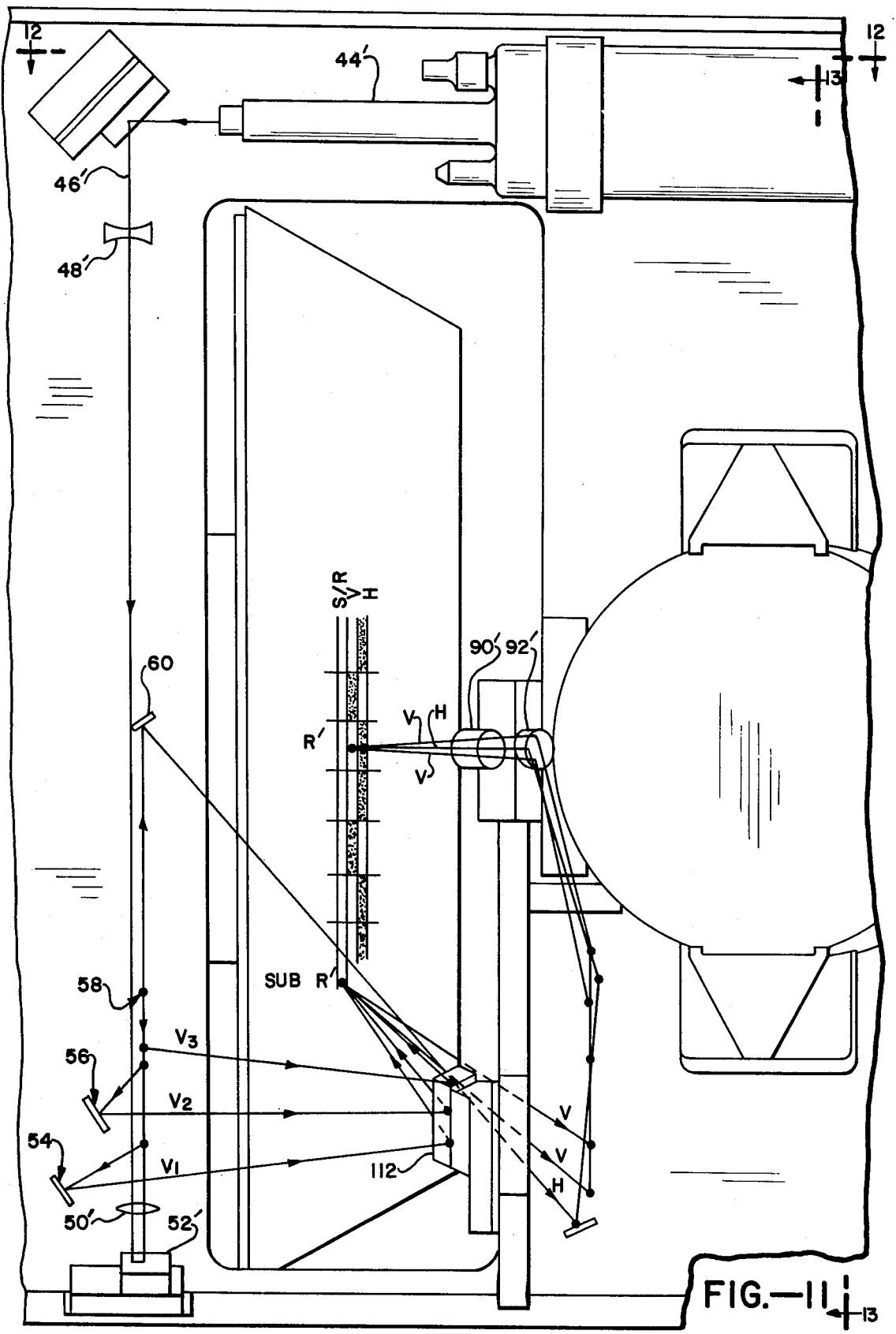
FIG.—11

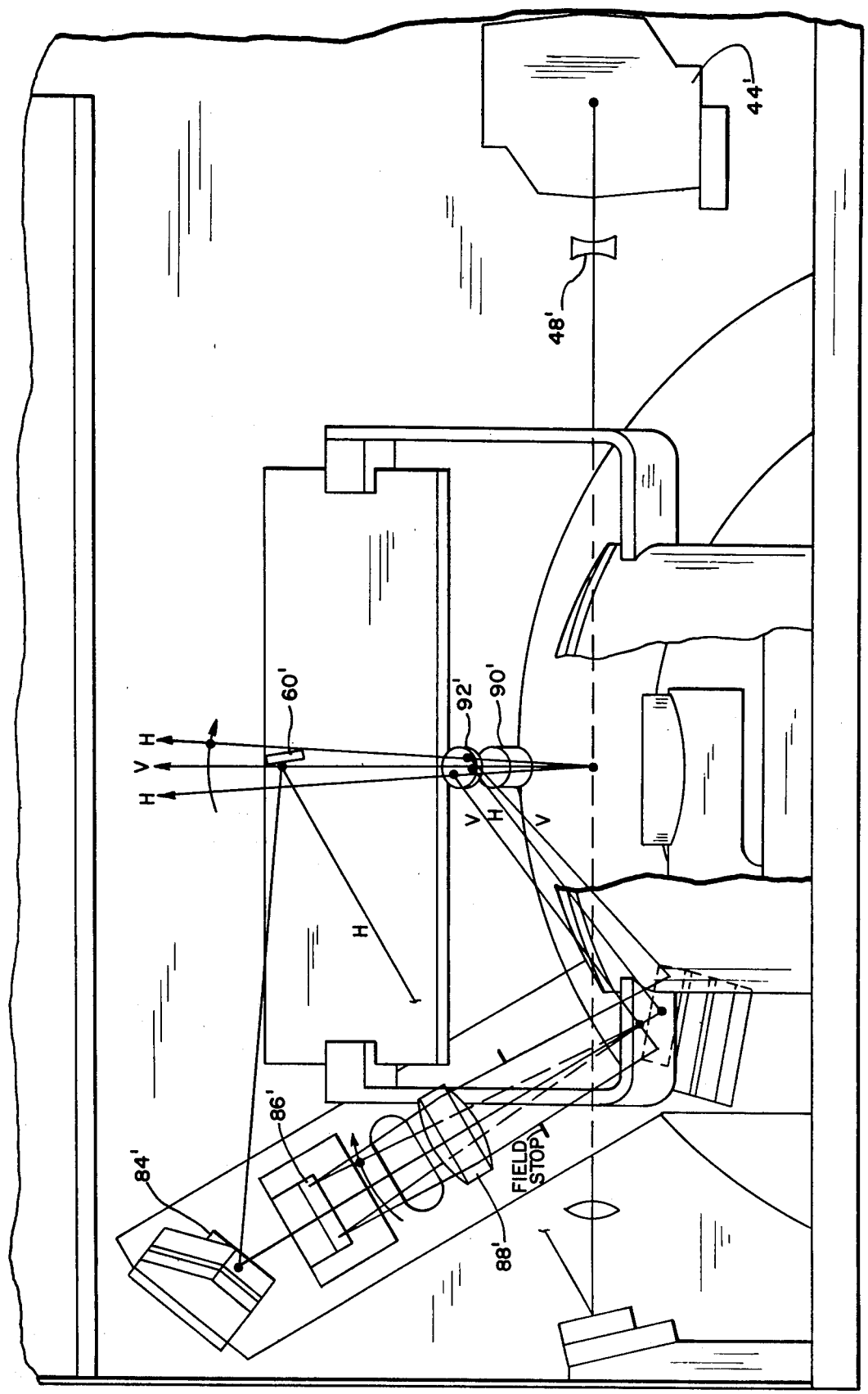
FIG.—12

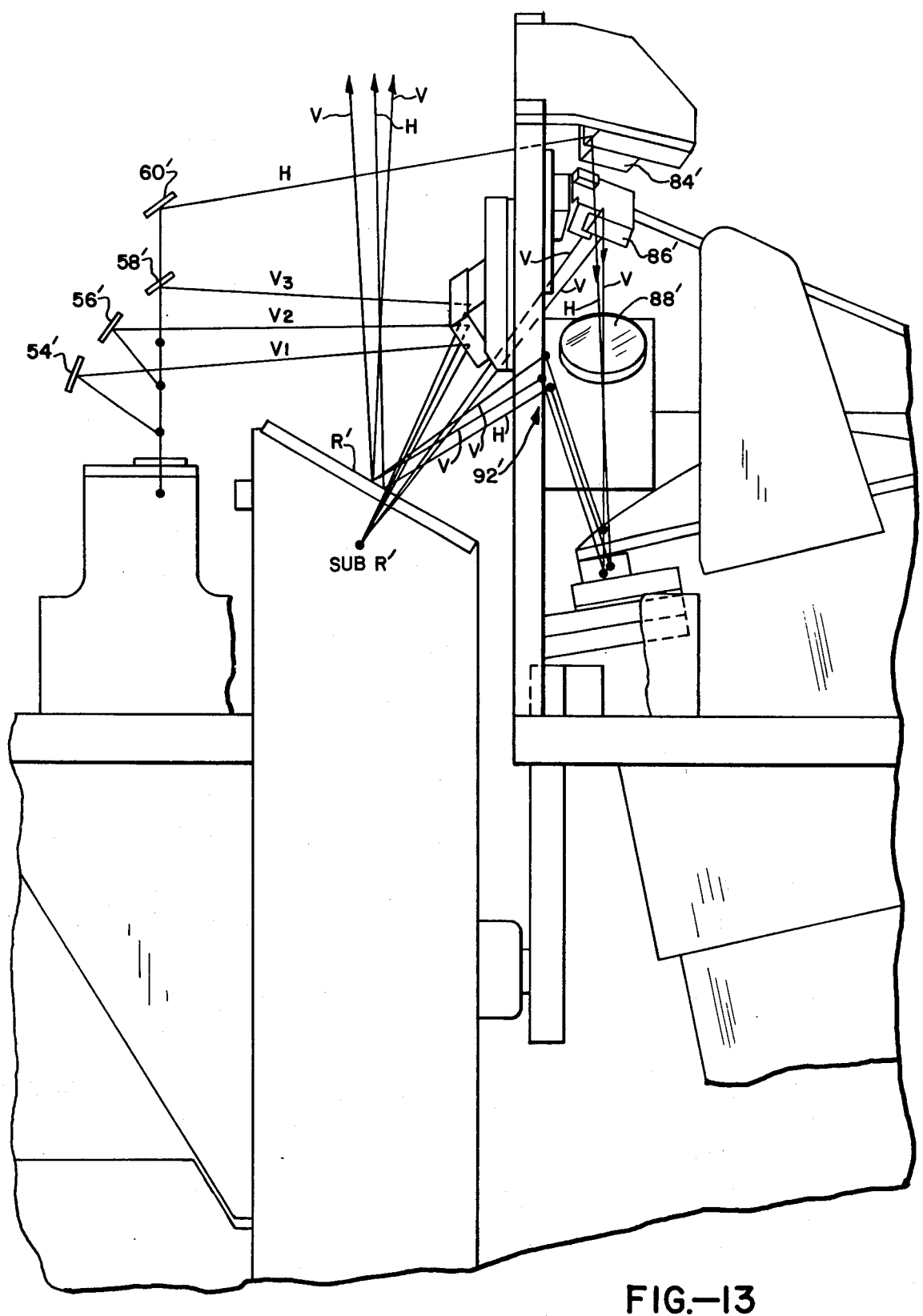
FIG.—13

METHOD AND APPARATUS FOR READING CODED LABELS

This is a continuation of application Ser. No. 677,865 filed Apr. 19, 1976, which application was a continuation of Ser. No. 568,666 filed Apr. 16, 1975, which application was a continuation of Ser. No. 466,803 filed May 3, 1974.

BACKGROUND OF THE INVENTION

This invention relates to method and apparatus for the reading of coded labels, and more particularly, to such method and apparatus specifically designed for the reading of machine readable symbols which have been adopted in the grocery/supermarket industry and generally known as the grocery industry Universal Product Code (UPC).

Codes of the foregoing type are generally characterized as bar codes, consisting of a series of parallel light and dark bars of different widths being linear in one direction and having overall rectangular shape. Each character or digit of the code is represented by two dark bars and two light spaces. By way of example, a full description of this type of code is given in a publication entitled "U.P.C. Symbol Specification," dated May, 1973, and published by the Distribution Number Bank of Washington, D.C., which is administrator of the Universal Product Code and the UPC symbol for the Uniform Grocery Product Code Council.

Recently, a number of proposals have been made for various systems for reading such codes so as to provide the supermarket/grocery industry with the ability to label all of its products in machine readable form and, therefore, to provide check-out of merchandise via machine readable computerized equipment, which will substantially lessen the time and effort presently required to pass through the check-out counter as well as providing a complete and accurate inventory accounting system. It is an object of the present invention to provide an improved system for such purpose.

SUMMARY OF THE INVENTION AND OBJECTS

In general, it is an object of the present invention to provide a method and apparatus for the reading of coded labels on merchandise which will efficiently and accurately read such labels while reducing to a minimum the probability of a non-read state as well as providing an optimization of the system from a human engineering point of view.

Another object of the invention is to provide a method and apparatus of the above character which is particularly reliable, which utilizes a laser beam scanning system having a single rotating part, but nevertheless which provides a complex scan pattern having low non-read probability.

Any discussion of the provision of machine readable labeling on merchandise packages must begin with an assumption of the way in which such packages will be processed at a check-out counter. If this is considered in detail, it must be assumed that a person will be stationed at the check-out counter who will physically manipulate each package with respect to the machine readable coding thereon and the apparatus for reading such coding that it can be read, and thence that the merchandise will be bagged. In the event that the coded indicia on the merchandise is not machine read, the person or checker will be required to manually enter the coded indicia by some suitable means, such as a cash register type keyboard or the like. The UPC Symbol Specification provides, in addition to the machine readable bar code, an additional human readable code. In order to obtain satisfactory usage and acceptance of machine readable coding and systems of the type generally referred to herein, it is absolutely necessary that the percentage of non-read events occurring at a given check-out station be held at an absolute minimum, and that the accuracy of the system be assured.

Looking at the problem in greater detail, there are certain human factors involved which must be satisfied. First of all, packages of the normal size range from sizes such as a small package of gum to a large heavy box of soap or bag goods such as rice. Each and every one of these articles must be brought across some sort of reading window with appropriate coded labeling thereon put in such relation to the window that it can be read.

Defining the direction across the direction of the movement of goods as a target direction, it has been found that a 5 to 6 inch width of target area allows the checker fairly unrestricted targeting and, therefore, defines the width of a suitable window. By providing a target width of five to six inches allows the checker to pull merchandise across a window without really first having to concentrate on alignment of any label thereon with the window. It is possible to make such a window larger; however, it can be shown that this increases the scanning rate required to adequately cover the window to such a degree that electronic logic circuitry required to decode the results must be made at state of the art limits. This unduly increases the cost and complexity of the system.

Defining the direction in which the merchandise moves as the reach direction, it will be understood that the checker must reach across this dimension of the window in moving the merchandise thereacross.

Were the 6 inch transverse or target dimension also used in the reach directions, i.e. square geometry, check-out personnel fatigue would result. Accordingly, it is desirable to minimize the read pattern and window in that direction. The irreducible minimum is found from consideration of the dimension of the maximum field which the coded label presents for reading. In the case of the UPC, the maximum width of field is one and one-half ($1\frac{1}{2}$) inches (label has two fields) and a height of 2 inches. Analysis of this particular label for omnidirectional reading results in using the diagonal of the field width ($\sqrt{2}$) (1.5) inches less the oversquareness = 1.75 inches to which must be added .25 inch to allow for velocity of movement of an article of merchandise. The result is the 2 inch stated window dimension in the reach dimension. The foregoing shows that the minimum window dimension in the reach direction is determined by the maximum label field which must be read.

In addition to the foregoing, there is another reason for limiting the reach dimension of the window. If it is desired to prevent multiple read, that is, being able to read several things on the window at the same time, it is necessary to keep the reach dimension of the window smaller than the dimension of two small labels side by side, allowing some additional margin for the size of the box. Thus, another half inch or so in the spacing in between objects prevents the reach dimension or depth dimension from permitting multiple readout. In summary, it allows the electronics to discriminate when scanning the long dimension without having to discriminate in the depth dimension. This provides a considerable simplification since the scanning operation will often read the same label many times and it would otherwise be difficult to distinguish between a label being read many times and a second identical label passing the window within the same field of view.

An additional reason for making the window small in the depth dimension is that it allows retro-directive viewing of the label which is synchronized to the scanning beam. This permits operability of the system in the typically brightly lit situation of a check-out station, and provides a good signal-to-noise ratio notwithstanding background lights. Were this dimension made somewhat larger, it would necessitate unduly large retro-directive receiving optics. This results from the fact that a two-inch depth dimension is approximately the same size as can be covered by most packages and, therefore, the packages themselves will block a great deal of the retro-directive view of the window. It can be shown that the approximate fastest speed that a checker moves an article of merchandise across a reading window is about 100 inches per second which, when consideration are taken regarding the maximum size of UPC labels, indicates that approximately a two-inch depth dimension is the minimum amount permissible without placing undue constraints on other factors, particularly the decode electronics.

The next human factor consideration generally leads to the desirability of a quality characterized herein as "front looking". When a checker is reaching for and pulling an article of merchandise across a window, it is highly probable that the checker will orient the label code in such a way as to face the direction of motion or depth dimension of the window as it passes thereby. If the labels are on the sides, this means that a vertically oriented label will have to be read. In many instances with loosely packed merchandise, such as six packs of bottled goods, it will not be possible to tip the article as it passes the window. Accordingly, if it is not bottom labeled, it is necessary for the reading mechanism to be capable of reading a vertically oriented label. This is largely a human factor problem, but cannot be ignored since the checker will look at the package when it is picked up, notice where the label is located, and pass it by the window with the label generally facing the depth dimension of the window. When further packaging practices are considered, it will become apparent that side labeling of packages will be desirable and, therefore, create a necessity for coded label reading systems to be front looking and capable of reading up the side of a package.

Previously proposed scanning procedures have largely been inadequate to scan UPC label codes for one reason or another. The single X pattern has a poor form factor in that when projected in the sense of front looking to a vertically oriented label it tens to collapse and, therefore, read only labels which are oriented vertically and capable of being read by a horizontal scan line. Multiple X patterns such as a group of Lissajous figures suffer from the same difficulty and a further difficulty in that the speed of laser movement caused by the production of such figures is variable over a significant range. When coupled with the differences in size of labels, this leads to a raw data output varying over such a wide range as to press the design of the decoding and processing electronics to unacceptably high demands.

The present invention is predicated upon the realization that the constraints presented by the foregoing analysis can be accommodated with a particular scan pattern which very adequately covers a window area of the ratio of three (3:1) to one for example in such a way as to maintain a very low probability of non-read while permitting the reading of labels oriented in any direction with respect to the window and also permitting the reading of labels a significant distance up the wall of merchandise packaging. The scan pattern of the present invention consists of a plurality of scan lines directed across the depth dimension of the window and interspersed from time to time with a horizontal scan line. More specifically a scan cycle which covers the entire window is composed of a group of vertical scan lines which are interspersed across the window followed by a single horizontal scan line which is located midway across the window. In each subcycle the horizontal scan lines repeat in the same location, whereas the vertical scan lines are each progressively shifted a predetermined increment with respect to a previous subcycle until the entire window has been covered by vertical scan lines. This pattern represents somewhat a lacing over a tear in fabric or stitches bridging a cut.

In addition to the matters discussed above, there are additional constraints on the speed of scanning and the nature of the scan which relate to the reading processing logic. One of these is that it be within the relatively inexpensive LSI component art, i.e. within microsecond logic speed. As already mentioned, the scan speed of the present invention is substantially uniform so that variations in logic processing speed do not occur. However, the scan velocity for a one microsecond logic speed is approximately 8,000 inches per second. If this speed is assessed in terms of covering a six inch by two inch window with every conceivable type of pattern, an optimum pattern emerges which is disclosed herein. Accordingly, linearity of speed and restraint of speed to a relatively fixed value permits the use of processing logic and associated algorithms which are much easier to handle and reduces the cost of the system.

The apparatus for carrying out the foregoing procedure as disclosed in the present invention consists of a somewhat complex optical system. However, the scanning element of this system consists of a single rotating part which is the only moving part which is required. Accordingly, the system is exceedingly simple in terms of mechanical operation. More specifically a plurality of mirror flats are mounted on a surface of revolution which is rotated about its axis. The orientation of each mirror element is such as to cause a single horizontal raster line to be scanned across the window interspersed with a plurality of vertical lines generated by a combination of mirror elements, each of the vertical elements being of a given subcycle being spaced across the window and of each successive subcycle being incrementally shifted so that a multiplicity of subcycles causes the window area to be uniformly scanned by vertical lines. A horizontal scan line repeats once each subcycle.

By suitable arrangements a single laser beam is utilized to provide all of the vertical and horizontal scan lines.

A further general object of the invention is to provide a method and apparatus for reading coded labels of the above character which has good front looking characteristics, is retro-directive over a wide aperture and, therefore, insensitive to ambient light conditions.

Another object of the invention is to provide a method and apparatus of the above character in which the pattern efficiency is high, having a lowest scan velocity for a maximumly efficient pattern and, therefore, capable of being decoded by one microsecond logic, and further in which the scan velocity is substantially constant.

Another object of the invention is to provide a method and apparatus of the above character having a scan pattern in which the average power in the reading window is maintained at a low level.

Another object of the invention is to provide a method and apparatus of the above character which is capable of reading labels omnidirectionally even when rotated while being passed through the read window.

Another object of the invention is to provide a method and apparatus of the above character having a substantial depth of field so that codes displaced as much as a few inches from the read window can still be read.

These and other objects and features of the invention will become apparent from the following description and claims when taken together with the accompanying drawings.

BRIEF DESCRIPTION OF THE DRAWINGS

FIGS. 1 through 10 relate to a first embodiment of the invention, while FIGS. 11 through 14 relate to a second embodiment, FIGS. 1, 5, 6 and 10 being common to each embodiment.

FIG. 1 is an elevational view, partially in schematic form, of a laser label reader constructed in accordance with the present invention.

FIG. 2 is a top plan view of the label reader of FIG. 1 taken along the lines 2—2.

FIG. 3 is a top plan view of the label reader of FIG. 2 taken along the lines 3—3.

FIG. 4 is a top plan view of the label reader of FIG. 2 taken along the lines 4—4.

FIG. 5 is a top plan view of the label reader of FIG. 1 taken along the lines 5—5.

FIG. 6 is a linear optical diagram schematically illustrating the equivalent optical circuit of the apparatus of the present invention.

FIG. 7 is a simplified schematic illustration similar to FIG. 3 showing the label reader of FIG. 1 emphasizing those components in operation during horizontal scan.

FIG. 8 is a simplified schematic illustration similar to FIG. 3 showing the label reader of FIG. 1 emphasizing those components in operation during vertical scan.

FIG. 9 is a simplified schematic illustration similar to FIG. 3 emphasizing and illustrating those components used in retro-directive viewing of the package label.

FIG. 10 is a diagram of the scan pattern generated by the apparatus of FIGS. 1—9.

FIG. 6 is a simplified optical diagram of the apparatus of FIGS. 1-5.

FIG. 11 is a top plan view illustrating a second embodiment of the label reader constructed in accordance with the present invention.

FIG. 12 is a front elevational view taken from the lines 12—12 of FIG. 11.

FIG. 13 is a side elevational view taken from the lines 13—13 of FIG. 11.

FIG. 14 is a diagram of the masking pattern employed in the mirror wheel of the apparatus of FIGS. 11-13 to time segregate vertical and horizontal scans.

DESCRIPTION OF THE PREFERRED EMOBODIMENTS

Referring now generally to FIGS. 1 through 5, there is shown a label reading apparatus constructed in accordance with the invention which generally consists of a terminal or check-out station 20, having, for example, a conveyor belt 22 which conveys articles toward the end of the station at 24. The conveyor belt can be of any suitable sort for delivering packaged merchandise in the direction indicated by the arrow 26. There is shown a continuous belt passed about a drum 28. However, other types of conveyors may be used and, in fact, a conveying system is not necessary as the movement of the merchandise 30 can be accomplished by hand.

The end of the station beyond the conveyor belt is provided with a coded label reader 32. The reader includes a window 34 in its upper wall 6 past which packages are advanced by store personnel, such as a checker. Preferably, the window is of an oblong shape having an approximate height-to-width ratio of 1:3. The direction of movement past the window in line with arrow 26 will be defined herein as height or as a vertical movement, while movement in the transverse direction to the conveying equipment will be defined as width or as horizontal movement. As shown, packages to be processed are provided with a suitable bar type coded label by any suitable means as is well known under the UPC specification. As will become apparent, while the present invention is particularly adapted to use in reading the UPC coded label, other labels can be read with suitable modification. As will be described hereinafter, the window passes a laser scanning beam, indicated generally at 38, to pass therethrough and to strike a label 40 appearing on the merchandise 30. The window 34 also provides a retro-directive viewing aperture for observing the reflectivity of the spot of the laser beams as it scans the label on the package and for passing the variations in reflection back into the laser reading optics, generally indicated at 42.

The following discussion will set forth the specific form of the first embodiment of the apparatus with reference to FIGS. 2 through 6, which, because of the folded nature of the optical path, appears complex. Subsequently, simplified schematic diagrams will be used to explain the operation of the device, which, when taken with the information now to be given, will render the invention fully understandable.

Referring more specifically to FIGS. 2 through 6, the system of the present invention includes a helium-neon laser 44 having a narrow beam 46 output of approximately 2 milliwatts, in the red region of the spectrum at 6328 angstroms. The beam is passed through rotating optics to a negative lens 48 which expands the beam somewhat. After further routing optics, the beam is brought through a positive focusing lens 50 arranged so that the beam is then focused through sub-raster mirror 52 to be hereinafter described to a plane just beyond window 34. After passing through the positive lens 50, the beam is brought through a series of beam splitters 54, 56, 58, and mirror 60, the purpose of which is to create three separate beams $V_1$, $V_2$, and $V_3$, which will be used for vertical scanning and one beam H which will be used for horizontal scanning. As will become apparent, the three vertical beams will be time shared such that the vertical beam $V_1$ will be responsible for the first set of eight lines that will make up the vertical scan pattern. Beam $V_2$ will be associated with the second set of eight lines, and beam $V_3$ will be associated with the third set of eight lines so as to obtain twenty-four vertical lines in the scan pattern. The horizontal beam H will be associated solely with the horizontal scan line to be hereinafter discussed.

Moving Mirror Assembly

Each of the vertical ($V_1 V_2 V_3$) and horizontal (H) beams is directed through various routing optics to impinge one or more times upon a moving mirror assembly 60, which will now be described. The moving mirror assembly 60 includes a mirror wheel 62 having an outer rim 64 lying approximately on the surface of revolution in the shape of a frustum of a cone supported about its axis 66 by a disc 68 and axle shaft 70, the axle member being connected to a motor 72 for driving the same at a predetermined speed. The periphery of the rim 64 carries a plurality of flat mirrors 74-1 through 74-24 thereon which are located approximately at the respective angles labeled in FIG. 5. Each of the mirrors defines, therefore, a surface having a normal vector $\vec{n}_i$ which defines an angle of tilt of the mirror with respect to a vector $\vec{r}_i$ passing through the axis of revolution, for purposes to be hereinafter described. Each of the mirrors is labeled in the attached drawing and the following chart indicates the raster and sub-raster tilt of each of the mirrors by number. Since the angle of tilt is with respect to the normal vector $\vec{r}_i$ otherwise centered through the axis of rotation of the moving mirror assembly, it will become apparent that a slight shifting of the surface of each mirror across adjacent surfaces will take place. In order to avoid dead time due to gaps it is desirable to compute the amount of overlap caused by this tilting and to grind and adjust the mirrors in position so as to provide a substantial edge-to-edge relationship between each of the mirrors. The following table gives the degree of tilt associated with each of the mirrors. If will be noted that the mirrors form a sequence in which there are horizontally labeled mirrors 1, 4, 7, 10, 13, 16, 19 and 22, while the remaining mirrors are designated as vertical mirrors. As the assembly rotates, the uppermost mirror will be defined to be a raster mirror R, while that mirror twice removed counterclockwise will be defined as a sub-raster mirror, Sub R. It will be noted that all of the horizontal mirrors bear a tilt angle of 0° while the vertical mirrors bear tilt angles of various small amounts.

Gating Structure

The disc member 66 of the mirror wheel is provided with a plurality of apertures 80-1 through 80-8, being 24 in number, but coincidentally arranged in groups of four, connected with each other, thereby reducing the apparent aperture count to eight. As will be discussed, both the vertical and horizontal beams are passed through various portions of these apertures which when open serve as a pass gate for the particular beam and when closed serve as a stop gate. Pass gates are labelled V or H in accordance with the beam they pass.

Horizontal Deflection System

The horizontal beam is passed from the final mirror element 60 in the beam splitter which is a mirror and is passed through a fortuitously located portion of an aperture 80-n generally indicated as available for the passage of vertical beams. The horizontal beam is then redirected by a folding mirror 82 through a portion of the same aperture 80-n designated for the horizontal beam. It will be noted that the length of the horizontal passageway is approximately one third of the circumference of the gate which corresponds with the horizontal mirrors taking one third of the circumference of the mirror assembly. The horizontal beam is then redirected by a second folding mirror 84 through a beam recombiner 86 which is transmissive to the horizontal beam. Both the horizontal and vertical beams thence travel in line through a relay lens system consisting of a first lens 88 and an insertion lens 90 following an insertion and rerouting mirror 92. The beams are incident on the topmost mirror of the mirror assembly, defined as the raster mirror R, and thence reflected by that mirror to a window or aperture mirror 94 which directs the beam through the read window 34 of apparatus. Lenses 88 and 90 form a relay pair or combination wuch that any translatory movement of the beams is transformed into angular motion at the mirror R, for purposes which will be described in greater detail in connection with the vertical deflection system. As the moving mirror assembly rotates, the stationary horizontal beam is deflected along a horizontal path by the raster mirror, the deflection magnification being controlled by the angle of incidence of the beam onto the raster mirror. In the present specific example, there is approximately 15° between mirrors and the arrangement is such that the horizontal sweep will be approximately 6 inches at the window 34.

Vertical Deflection System

Referring now to FIGS. 1 through 6, together with FIG. 8, the vertical deflection system will be explained. As previously explained, each of the vertical beams $V_1 V_2 V_3$ is developed in a beam splitter 54, 56, 58, as clearly shown in FIGS. 2 and 3. The beam splitters each deflect the beam an amount such that the path length of the beams $V_1 V_2 V_3$ when redirected toward the moving mirror assembly will be equal. This is done by deflection of the beam to a routing mirror in back of the original projection line with respect to beams $V_1$ and $V_2$, the amount of rearward projection being the difference between the distance from that point to the point labeled 58 on the drawing, i.e., the beam splitter producing beam $V_3$. The beam splitters have the following values: beam splitter 54, 25%; beam splitter 56, 33⅓%; and beam splitter 58, 50%. From the sub-raster mirror, Sub R, the vertical beams are passed through rerouting optics consisting of mirror 96 and mirror 98 so as to pass through the vertical gating structure V of the assembly disc 68 and thence to beam recombiner 86, through relay lens assembly 88, 90 to the raster mirror R and thence to aperture mirror 94 and through the window 34. As previously set forth, the tilt angle of the sub-raster mirror Sub R and the tilt angle of the raster mirror R are arranged to produce cancellation of the horizontal sweep and development of a vertical sweep for each of the vertical beams. Since the beams are angularly displaced in space at the beam splitter, they will also be angularly and spatially displaced at the reading window. However, the magnification of this displacement will differ depending upon the angle of incidence of the beams $V_1 V_2 V_3$ upon the sub-raster and raster mirrors as well as the optical system generally.

As shown somewhat more particularly in the simplified optical schematic of FIG. 6, the relay lenses system 88, 90 accepts the vertical rays which are moving across the lens system in space at 88 and is so constructed as to bring these rays moving in space to a point wherein they have substantially solely angular movement at the raster surface. In this way, the complete surface of the raster mirror is usable for the purpose of creating scan lines without having the vertical scans run off the edge of the raster mirror. In order to segregate the three vertical scan lines in time, it will be noted that these lines are moving in space as they reach the recombination optics. Thus, by placing a properly positioned slit at this location, it is possible to segregate the vertical lines such that only one of the vertical lines appears at the raster during each 5° portion of the 15° raster sweep.

Combined Operation of the Horizontal And Vertical Deflection Systems

The result for the first eight sweep lines is illustrated in FIG. 6. As the rotating wheel proceeds bringing element 74-4 to the raster position, the eighth sweep line will again be horizontal, as shown in FIG. 6. Thus, the first line is horizontal during the 15° passage of horizontal mirror 74-1 while sweep lines 2, 3 and 4 are generated by the combination of sub-raster mirror 74-4 and raster mirror 74-2. After these lines have passed, lines 5, 6 and 7 are generated by the combination of raster mirror 74-3 and sub-raster mirror 74-5, the tilt angles being adjusted such that sweeps 5, 6 and 7 are shifted by a predetermined increment away from the initial sweep lines 2, 3, and 4. Subsequently, mirror element 74-4 becomes the raster mirror and the next horizontal sweep, numbered 8, takes place. This represents a sub-cycle. The next sub-cycle, beginning with horizontal sweep 8, proceeds with two sets of vertical sweeps again being shifted another predetermined increment by the adjusted tilt angles of the moving mirror assembly until each sub-cycle is completed. At the end of four sub-cycles, 24 vertical scan lines have been generated across the surface and progressively shifted away from the initial scan lines. The vertical scan lines are in groups of three because of the geometry selected for this particular window and begin at uniformly spaced locations across the window face. Within each sub-cycle there is one horizontal scan line. The complete scan generated by a one-half rotation of the mirror wheel is shown in FIG. 10 with the appropriate designation (1-24) of each scan.

The utilization of one rotating mechanism to generate an orthogonal (in this case vertical and horizontal) scan pattern depends upon the generation of one scan direction tangentially from one element (in this case the horizontal scan generated by the raster mirror) and the generation of a tangential scan from a second element (sub-raster) which is reimaged by an optical train which may or may not include the raster element. The benefit of utilizing the raster element is two-fold: 1) a virtually coincident source of both scans so that the pattern projects with dimensional integrity, and 2) a spatially compact retroviewing collection system.

The reimaging of the sub-raster scan onto the raster scan element has several purposes:

1. rotation of the sub-raster scan to allow vector addition and subtraction of the raster and sub-raster scans for resultant scan orientation.
2. magnification or demagnification of the sub-raster scan to facilitate the vector combination referenced in 1) above.
3. conversion of the sub-raster scan image at the raster element into a point image to improve duty cycle.

In the particular case the scan pattern has two nominal projection planes utilized for reading: the plane of the window and the plane of a package with a symbol on the side facing the direction of package movement. In these two reading planes, the spot scan velocity should be uniformly and linearly equal to the nominal design velocity of 8,000 ips. For these conditions, the vertical scan velocity in the projection perpendicular to the beam direction equals 6128 ips. This consideration is all prescribed by constraints in the symbol or label viewing region.

Creation of the 6128 ips vertical scan velocity while maintaining an 8,000 ips horizontal scan velocity which projects uniformly in all relevant directions, then determines the vector combination criteria at the raster scan element. To create a 6128 ips vertical scan from an element which creates an 8,000 ips horizontal scan component requires a 10,076 ips sub-raster scan component oriented at 127°27' to the horizontal scan component.

Now the role of the relay imaging system can be explained as follows. The sub-raster element generates a roughly 8,000 ips scan magnitude (since its angular scan velocity is coupled tightly to the raster angular scan velocity). This 8,000 ips sub-raster scan velocity must be magnified by the relay lens elements to 10,076 ips in the raster element image plane.

The magnified sub-raster scan image is rotated by the relay mirrors to the prescribed 127°27' relative to the raster scan direction.

Finally the relay lenses convert the projected 10,076 ips magnified sub-raster scan (which over its length of travel to the raster element would have created a line image) into a point image with purely an angular scan component.

Progression of the vertical scan images across the dimensions of the pattern is accomplished in two steps. Step 1 is to utilize the raster angular rotation of 15° to spatially position three vertical scans 5° apart. Step 1 is done uniquely as each raster element rotates through its useful aperture.

Step 2 is to sequentially displace the position of the set of three vertical scans produced in Step 1 by ⅝° to create eight such sets uniformly spaced over the 5° space between scans within each set. Step 2 is accomplished by the tilting of the raster and sub-raster elements (in combination) relative to the nominally tangential (surface normal vector in alignment with radius vector passing through axis) orientation fundamentally described. A table giving appropriate tilt angles for the specific apparatus disclosed herein will now be given.

| Column | A | B | C | D | E | F | G | H |
|---|---|---|---|---|---|---|---|---|
| | Raster Nr. | Sub Raster Nr. | Direction | Raster Tilt | Sub Raster Tilt | Sub Raster Tilt Projection (−E) | Total Displacement (D+F) | Sequence |
| | 1 | 3 | H | 0 | — | — | — | — |
| | 2 | 4 | V | −2½ | 0 | 0 | −2½ | 2 |
| | 3 | 5 | V | −2 | −½ | +½ | −1½ | 3 |
| | 4 | 6 | H | 0 | — | — | — | — |
| | 5 | 7 | V | −½ | 0 | 0 | −½ | 4 |
| | 6 | 8 | V | +2 | +1½ | −1½ | +½ | 5 |
| | 7 | 9 | H | 0 | — | — | — | — |
| | 8 | 10 | V | +1½ | 0 | 0 | +1½ | 6 |
| | 9 | 11 | V | +6 | +3½ | −3½ | +2½ | 7 |

-continued

| Column | A | B | C | D | E | F | G | H |
|---|---|---|---|---|---|---|---|---|
| | Raster Nr. | Sub Raster Nr. | Direction | Raster Tilt | Sub Raster Tilt | Sub Raster Tilt Projection (−E) | Total Displacement (D+F) | Sequence |
| | 10 | 12 | H | 0 | — | — | — | — |
| | 11 | 13 | V | +3½ | 0 | 0 | +3½ | 8 |
| | 12 | 14 | V | −6 | −2½ | +2½ | −3½ | 1 |
| | 13 | 15 | H | 0 | — | — | — | — |
| | 14 | 16 | V | −2½ | 0 | 0 | −2½ | 2 |
| | 15 | 17 | V | — | −½ | +½ | −1½ | 3 |
| | 16 | 18 | H | 0 | — | — | — | — |
| | 17 | 19 | V | −½ | 0 | 0 | −½ | 4 |
| | 18 | 20 | V | +2 | +1½ | −1½ | +½ | 5 |
| | 19 | 21 | H | 0 | — | — | — | — |
| | 20 | 22 | V | +1½ | 0 | 0 | +1½ | 6 |
| | 21 | 23 | V | +6 | +3½ | −3½ | +2½ | 7 |
| | 22 | 24 | H | 0 | — | — | — | — |
| | 23 | 1 | V | +3½ | 0 | 0 | +3½ | 8 |
| | 24 | 2 | V | −6 | −2½ | +2½ | −3½ | 1 |
| Vertical Scan Nr. | 1 | 2 | 3 | 4 | 5 | 6 | 7 | 8 |
| Displacement Value | −3½ | −2½ | −1½ | −½ | 0 +½ | +1½ | +2½ | +3½ |

Thus, FIG. 10 shows the completed scan, each line being labeled with a number (1-24) appears as a pattern resembling a stitched scar having 24 vertical scans of 0.25 milliseconds each and four horizontal scans of 0.75 milliseconds each, the sequence being horizontal, six verticals in the sequence numbered to form each subcycle 1-7, 8-14, 15-21, 22-28. The mirror assembly contains 24 facets, 12 of which represent a complete cycle. It is rotated 3,400 r.p.m. to produce the stated raster trace speeds.

By way of further explanation of the optical properties of the system, the relay optical system has a field stop which limits the excursion of those beams which are going to become vertical beams. The edges of the field stop are adjusted so that the vertical beams coming out of the window at the top of the scanner appear to automatically turn on and off at the exact appropriate time. In addition, the relay optical system at the sub-raster and raster points can both be considered the entrance pupil and exit pupil of the relay optical system. The negative and positive lens combination 48, 50 are separated by a distance such that the light beam that comes out of the laser is focused into a point image in the field stop of the relay optical system. The injection lens relays that image to form a new image of that image at the top of the window or just beyond the top at plane 103.

Retro-directive Viewing System (Collection Optics):

Referring now to FIGS. 1 through 5, together with FIG. 9, there is shown the retro-directive viewing system of the present invention which generally includes the aperture mirror 94 which transfers the entire aperture of the viewing window downwardly to the raster mirror R, upwardly to a rerouting mirror 100, through a focusing lens 102 to a photomultiplier tube 104. The apertures of the retroviewing optics are such that complete viewing of the aperture 34 is possible. However, the movement of the raster mirror is retro-directive with respect to the horizontal scan and, therefore, the horizontal scan line appears as a fixed location at the photomultiplier tube. However, by restricting the movement to one dimension, the selection and construction of the photomultiplier tube is straightforward, standard side cathode tube, being entirely satisfactory.

The retro-directive lens 102 is an aspheric lens which is corrected for spherical aberration and coma thereby giving a sharply focused image of the lines of scan for the scan plane 103. At that image of the system of the lines at the top we place a narrow band spectral filter 105 which is optimized for the cone of light being brought to a focus there. Coincident at that point is what we call a spatial filter which is a small rectangular slot which limits the amount of light that is being brought back from the area at the top of the window limited only to that part of the scan which we wish to collect and therefore more efficiently rejecting the background light. Further, in explanation of the collection optics, it should be noted that the raster mirrors on the wheel which rotates become the entrance pupil of this part of the system. The raster mirrors are separated from the collection lens by approximately its focal length. That automatically makes the collection system a telecentric collection system, allowing optimum utilization of the spectral filter which has a transmission dependance on the angle of the light coming in. In being telecentric, a constant angle of the light coming in is maintained over the field of view of the scanning system, thereby giving optimum specifications on the transmission properties of the spectral filter.

Reference is now made to FIGS. 11 through 14 which show a second embodiment of the present invention utilizing a considerably simplified optical system made possible by the utilization of a different type of gating system. However, the simplification occurs in the routing optics rather than in the active optical elements themselves, so that the optical description of the simplified schematic of FIG. 6 is equally applicable to FIGS. 11 through 14. Accordingly, the description can be considerably simplified, like parts being given like numbers with the addition of a prime (').

Thus, there is provided a laser 44' having an output directed through a negative lesn 48', a positive lens 50', and routed through a beam splitter 54', 56', 58', for providing the three vertical beams, $V_1V_2V_3$, having equal optical path lengths similar to that heretofore described. The fourth horizontal beam H is also provided from a reflecting element 60' and is routed by element 110 and thence to the raster surface of the top mirror. The horizontal scanning vector H motion is illustrated best in FIG. 12.

The vertical scan vectors are redirected via mirror 112 to the sub-raster surface Sub R and thence via beam combiner 86', lens 88', injection mirror 92' and injection lens 90' to the raster surface, the output vertical beam motion being best seen in FIG. 13.

FIG. 14 illustrates the nature of the surface as it appears and is an enlargement of that shown in FIG. 11. The surface is provided with three channels, the first, a sub-raster channel, being uppermost and which is contacted by the vertical beams upon the sub-raster mirror. The vertical raster channel is shown as blanked through every horizontal raster mirror, while the horizontal raster channel is blanked throughout the distance of scan of each of the vertical raster mirrors. Since the beams are slightly displaced, as shown particularly in FIG. 11, the various vertical or horizontal blanking features previously provided by the gating mechanism shown in FIG. 5 are now provided by the blanking or masking technique directly on the surface of the mirrors. As previously stated, the operation of the embodiment of FIGS. 12 through 14 is the same as that previously described.

To those skilled in the art to which this invention pertains, many modifications and adaptations will suggest themselves without departing from its spirit and scope. In the disclosures herein, a substitution of a different gating means has resulted in a considerable simplification of the apparatus.

A specific object of this invention was to read UPC symbols which has as an embodiment of its geometric specification a given oversquareness condition to a symbol field. A symbol field may be one of several fields of the symbol which in order to be decoded while maintaining sufficient noise discrimination must be read entirely by one scan. The oversquareness of the field is determined by the difference of height and width of the field and is so specified to allow orthogonal scan vectors to be utilized to allow omnidirectional orientation of the symbol.

The oversquareness dimension will determine the scan repetition rate (cycle time) for scans oriented perpendicularly to the symbol velocity direction. Concurrently, the oversquareness will determine the spatial overlap required for scan segments oriented parallel to the symbol velocity direction. In the particular case of this invention, the pattern was governed by the UPC symbol specification as follows:

1. orthogonal scans (90° angular redundancy)
2. 2.25 milliseconds between repetitive horizontal scans to allow 100 ips vertical symbol velocity (time redundancy)
3. increment-vertical scan shift 0.224 inch adjacent vertical scan spacing (spatial redundancy)

Other possibilities exist, for example, if it were deemed advisable to select a rectangular window having a width-to-length ratio of 1:2, the same system as provided herein could be adapted to such use, it being possible to eliminate the necessity of one of the vertical beams. It is readily apparent that a double vertical scan through each sub-cycle would be adequate to cover the space involved. Also, while the sub-raster mirror has been shown as being displaced by two mirrors rotationally from the raster mirror, it is equally possible that the sub-raster mirror can be located wherever convenient on the wheel. As an extreme example, it is also to be understood that the scanning procedures set forth and characterized as a method herein are obtainable, although with considerable mechanical inconvenience by apparatus which might be entirely different from that disclosed herein, using other scan generating optics. Accordingly, it should be understood that the present invention should be interpreted in a breadth and scope commensurate with the broad aspects of the disclosures herein and that the method is not limited to the specific details of construction of the preferred embodiments shown, although the embodiments do represent the best mode of apparatus for carrying out the invention known at this time.

We claim:

1. A method of reading coded labels on merchandise passing a window defining a short vertical dimension in the direction of movement of said merchandise and a longer horizontal dimension across the direction of movement thereof, creating a laser beam moving said beam sequentially in a pattern consisting of a plurality of substantially vertical scans interspersed with substantially horizontal scan, said horizontal scan being stable with respect to said window, said vertical scans being moved across said window by predetermined increments until said window area has been covered by said scans, retrodirectively scanning the horizontal path of travel of said beam to receive reflection variations from said label, developing an electrical signal indicative of said reflection variations.

2. Method as in claim 1 in which said scanning is arranged in cycles consisting of sub-cycles, each comprising one horizontal scan and multiple vertical scans, said vertical scans beginning at one location of said window followed by at least one intermediate vertical scan starting across an intermediate location of said window, each subcycle of vertical scans being progressively shifted by a predetermined amount so that upon completion of sub-cycles said window has been substantially uniformly, vertically scanned.

3. Method as in claim 1 in which said vertical scan and said horizontal scan are made at the same speed in a plane immediately above said window and in a plane located vertically above said window at the edge where said merchandise first crosses.

4. Apparatus for reading machine readable coded labels on merchandise at a check-out station comprising window means associated with said check-out station, means for supporting said merchandise for movement past said window means, a laser source having an output beam, means for focusing said beam at plane slightly beyond said window, means for splitting said beam into multiple vertical beams $V_1$, $V_2$, $V_3$ having a predetermined angular divergence and a horizontal beam H, scanning optics including a mirror wheel having a plurality of mirrors thereon, a raster location, a sub-raster location, relay optics including means for having an input for accepting and for injecting said horizontal beam onto said raster location, movement of said wheel causing said horizontal beam to scan a horizontal angle translatable into a horizontal movement of said H scan line, means for delivering said vertical beams to said sub-raster location, said relay optics means having another input for accepting and for injecting said vertical beams $V_1$, $V_2$, and $V_3$ into said raster location, said relay optics means serving to transform motion of said wheel at said sub-raster location into a vector cancelling the horizontal scanning vector component at said raster location while adding a resultant vertical component thereto, and further serving to convert the resultant of the sub-raster scan into a point image with a purely angular scan component at the raster location, gating means for permitting only one of said beams $V_1$, $V_2$, $V_3$, H to pass through the system, and retrodirective viewing means for receiving reflected light from the area of impingement of said beam on a label, means for converting reflected light into electric signals indicative of the strength thereof.

5. Apparatus as in claim 4 in which each element of said mirror wheel has a predetermined tilt angle with respect to a radius vector passing through the axis of rotation of said wheel, each combination of raster and sub-raster tilt vectors for vertical scans being arranged to shift successive vertical scans across said window by a predetermined increment.

6. In apparatus for reading machine readable coded labels on merchandise at a check-out station including window means associated with said check-out station, means for supporting said merchandise for movement past said window means, a laser source having an output beam, scanning optics including means for moving said beam to generate a scan pattern of multiple vertical scans oriented in the direction of movement of said merchandise, said vertical scans being progressively shifted across to said window, and means for moving said beam to generate a horizontal scan for crossing said vertical scans at predetermined intervals, retrodirective viewing means for receiving reflected light from the area of impingement of said beam on said label, means for converting reflected light into electric signals indicative of the strength thereof.

7. Apparatus as in claim 6 in which said window area has an approximate height-to-width ratio of 1:3 and further in which said vertical and horizontal scans are arranged in a cycle in which the vertical scan is divided into a first set of three scans, approximately evenly arranged across said window and followed by a second set approximately evenly arranged across said window followed by a single horizontal scan, each element of the vertical scan being shifted slightly such that when the complete scan is made, vertical scan lines appear approximately uniformly distributed across said window.

8. Apparatus as in claim 6 in which said vertical scans are grouped in sub-cycles sets, each successive subcycle set being shifted a predetermined distance from the preceding and away from that location where said preceding set began.

9. Apparatus as in claim 6 in which said vertical and horizontal scans are arranged to form a complete scan cycle having sub-cycles thereof, each sub-cycle having vertical elements progressively shifted further away from the location of preceding scan lines by predetermined increments, said vertical scan lines being sufficient throughout one cycle to become uniformly distributed across said window.

10. Apparatus as in claim 9 in which each subcycle is characterized by three groups of vertical scans so distributed in space with respect to said window as to tend to uniformly trace said window in space and time during each cycle.

11. Apparatus as in claim 6 in which said vertical scan means, horizontal scan means, and said retrodirective receiving means each include a plurality of stationary members and further in which a single moving member is common to each of said means.

12. Apparatus as in claim 11 in which said moving member comprises a rotating wheel having a plurality of mirror elements disposed about the same and serving as scanning optics thereof.

13. Apparatus as in claim 12 in which said wheel consists of a surface of revolution, means for rotating said wheel about the axis of said surface of revolution, means forming a plurality of flat mirrors disposed on said surface, and oriented in predetermined tilt directions with respect to said axis of revolution, said tilt directions serving to cause the successive vertical scans to progressively shift a predetermined amount at said window.

14. Apparatus as in claim 6 further including optical gating means for selectively passing one of said vertical or horizontal scans.

15. Apparatus as in claim 6 in which said viewing optics include a large aperture, retro-viewing optical system arranged for accepting reflected light from labels passing said window, said reflected light being reflected back through said scanning optics.

16. Apparatus as in claim 6 in which said scanning optics consist of a surface of revolution in the form of a frusto-conical cone, said cone being formed with flats thereon, said flats having predetermined tilt angles with respect to a radius through the axis of said surface of revolution, a plurality of flat mirrors located on said flats, said mirrors consisting of horizontal scan mirrors having predetermined tilt angle and vertical scan mirrors having a predetermined tilt angle to the normal of said surface of revolution.

17. Apparatus as in claim 16 in which said vertical scan means comprises a mirror pair consisting of a raster mirror normally producing a horizontal scan and a sub-raster mirror, the combination having tilt angles which cause successive vertical scans to be shifted across said window by increments determined by the combination of tilt angles of said raster and sub-raster mirrors.

18. Apparatus as in claim 6 in which said raster scan retro-directively stabilizes the reflected beam with respect to horizontal scan to thereby reduce the necessary size of the photomultiplier in one dimension.

19. A method of reading coded labels on merchandise passing a window defining a short vertical dimension in the direction of movement of said merchandise and a longer horizontal dimension across the direction of movement thereof, creating a laser beam, moving said beam sequentially in a pattern consisting of a plurality of substantially vertical scans interspersed with substantially horizontal scans, said vertical scans being moved across said window by predetermined increments until said window area has been covered by said scans, retrodirectively scanning the path of travel of said beam to receive reflection variations from said label, developing an electrical signal indicative of said reflection variations.

20. Apparatus for reading machine readable coded labels on merchandise at a check-out station, means for supporting said merchandise for movement past said window means, a laser source having an output beam, means for focusing said beam at a plane slightly beyond said window, means for splitting said beam into multiple vertical beams $V_1, V_2, \ldots V_n$ having a predetermined angular divergence and at least one horizontal beam H, scanning optics including a mirror wheel having a plurality of mirrors thereon, a raster location, movement of said wheel causing said horizontal beam to scan a horizontal angle translatable into a horizontal movement of said H scan line, means for delivering said vertical beams to said sub-raster location, said relay optics means having another input for accepting and for injecting said vertical beams $V_1, V_2, \ldots V_n$ into said raster location, said relay optics means serving to transform motion of said wheel at said sub-raster location into a vector cancelling the horizontal scanning vector component at said raster location while adding a resultant vertical component thereto, and further serving to convert the resultant of the sub-raster scan into a point image with a purely angular scan component at the raster location, gating means for permitting only one of said beams $V_1, V_2, \ldots V_n, H$ to pass through the system, and retrodirective viewing means for receiving reflected light from the area of impingement of said beam on a label, means for converting reflected light into electric signals indicative of the strength thereof.

21. Apparatus for reading machine readable coded labels on merchandise at a check-out station comprising means forming an elongate window opening positioned transversely of the path of travel of said merchandise with its major length perpendicular to said path, means for introducing a pencil beam of electromagnetic radiation along a movable path passing through said window and intersecting the region through which said merchandise will travel, means for moving said beam along a scan pattern intersecting said region said scan pattern comprising a plurality of short strokes dispersed over said window and generally aligned with the minor axis thereof and a plurality of horizontal strokes aligned along the major axis thereof, means for causing said vertical strokes to be progressively shifted by predetermined increments so as to evenly cover said window and for causing said horizontal strokes to be interspersed repetitively among said vertical strokes, means for retrodirectionally detecting the refelctivity of said beam as reflected from said merchandise.

22. A method for reading machine readable coded labels on merchandise at a check-out station including an elongate window opening positioned transversely of the path of travel of merchandise at said station and having a major and minor axis associated therewith, said major axis being aligned transversely of the path of travel of said merchandise with respect to said path the steps of introducing a pencil beam of electromagnetic radiation along a movable path passing through said window and intersecting the region through which said merchandise will travel, moving said beam along a scan pattern intersecting said region said scan pattern including a plurality of short strokes dispersed over said window and generally aligned with the minor axis thereof and a plurality of horizontal strokes aligned along the major axis thereof, causing said vertical strokes to be progressively shifted by predetermined increments so as to progressively cover said window, causing said horizontal strokes to be interspersed repetitively among said vertical strokes, retrodirectionally detecting the reflectivity of said beam reflected from said merchandise.

* * * * *